(12) United States Patent
Konno

(10) Patent No.: US 7,484,341 B2
(45) Date of Patent: Feb. 3, 2009

(54) PACKAGING AND FILLING APPARATUS AND PACKAGING MATERIAL CUTTING DEVICE

(75) Inventor: Hidetoshi Konno, Tokyo (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 10/573,050

(22) PCT Filed: Jul. 28, 2004

(86) PCT No.: PCT/JP2004/010717

§ 371 (c)(1),
(2), (4) Date: Dec. 7, 2006

(87) PCT Pub. No.: WO2005/028314

PCT Pub. Date: Mar. 31, 2005

(65) Prior Publication Data

US 2007/0107376 A1    May 17, 2007

(30) Foreign Application Priority Data

Sep. 24, 2003    (JP)    ............................. 2003-331641

(51) Int. Cl.
  *B65B 57/00*    (2006.01)
  *B65B 9/00*    (2006.01)
(52) U.S. Cl. ................. 53/75; 53/451; 53/551
(58) Field of Classification Search .......... 53/451, 53/75, 551, 552; 83/72, 73, 76.6, 76.7; 493/30, 493/31, 32
See application file for complete search history.

(56) References Cited

U.S. PATENT DOCUMENTS

| 3,626,457 | A | * | 12/1971 | Duerr et al. ..................... 83/76 |
| 3,800,498 | A | * | 4/1974 | Suzuki ......................... 53/550 |
| 4,949,700 | A | * | 8/1990 | Ebashi ......................... 83/409 |
| 5,865,015 | A | * | 2/1999 | Kume et al. ................... 53/552 |
| 6,044,628 | A | | 4/2000 | Katayama et al. |
| 6,524,230 | B1 | * | 2/2003 | Harding et al. ................ 493/8 |
| 6,681,622 | B1 | * | 1/2004 | Valentine et al. .............. 73/159 |
| 6,877,412 | B2 | * | 4/2005 | Supe-Dienes ................ 83/482 |

FOREIGN PATENT DOCUMENTS

| EP | 0 890 515 A1 | 1/1999 |
| JP | 62-159298 | 10/1987 |
| JP | 10-15882 | 1/1998 |
| JP | 10-225900 | 8/1998 |
| JP | 11-29110 | 2/1999 |

* cited by examiner

*Primary Examiner*—Louis K Huynh
(74) *Attorney, Agent, or Firm*—Buchanan, Ingersoll & Rooney PC

(57) ABSTRACT

A packaging and filling apparatus fills a tube of a web of a packaging material with a fluid product, forms lateral seal bands, cuts each seal band of a series of pillow-like preformed bodies with a cutting device to form a packaging and filling container of the final form. The cutting device comprises a resistance measuring device for measuring a cutting resistance pressure that a packaging material cutting blade receives from the packaging material, and then outputting a measurement value obtained, and a blade monitoring device for monitoring the condition of the packaging material cutting blade based upon based upon a comparison of a difference between a maximum measured cutting resistance pressure and a constant measured cutting resistance pressure following the maximum measured cutting resistance pressure with a predetermined pressure difference reference value.

3 Claims, 2 Drawing Sheets

PACKAGING AND FILLING APPARATUS AND PACKAGING MATERIAL CUTTING DEVICE

This is a 371 national stage of the PCT/JP04/10717 filed Ser. No. 07/28/2004.

FIELD OF THE INVENTION

The present invention relates to a packaging and filling apparatus for producing a package container filled with a fluid product, such as milk or juice, and to a packaging material cutting device disposed in the apparatus.

BACKGROUND ART

The conventional methods of making package containers filled with liquid foodstuffs (including fluid products), such as milk, involve vertically sealing a web of packaging material, made of a flexible laminate, into a tubular form, then filling the tubular packaging material with the liquid foodstuff and, at the same time, laterally sealing the tubular packaging material.

FIG. 2 schematically shows an example of a filling and packaging apparatus with which such containers are made. The exemplified packaging and filling apparatus draws out a web 41 of packaging material having layers of thermoplastic resin as its internal and external layers wrapped in the form of a roll, and conveys the web 41 of packaging material within the packaging and filling apparatus by means of rollers. A strip of tape is joined to one edge of the web of packaging material by a strip tape applicator 43. Subsequently, the web 41 of packaging material is passed through a sterilizing liquid tank 44 to undergo sterilization. A squeeze roller and air knife 45 remove any sterilizing liquid remaining on the surface of the packaging material.

Next, forming rollers 46 form the above-described web of packaging material into a tube. One edge of the packaging material is covered with the other to form an overlap. A vertical seal element 42 vertically seals the overlap in the direction of the length of the tube. Then, the tube is filled with a liquid foodstuff from a filling pipe 47. While conveyed downward by a distance corresponding to the length of one packaging container, the tube is grasped between a sealing jaw and opposite jaw of each lateral sealing device 48. Lateral seal bands are formed by sealing the tube in the direction in which the bands intersect the tube, and thus a series of pillow-like preformed bodies 49 are formed at the same time. A cutting device (not shown) such as a knife cuts the middle of each lateral seal band between the pillow-like preformed bodies, thereby severing the pillow-like preformed bodies 49 from each other. Thus, packaging containers filled with the liquid foodstuff, which have the final form, are made.

FIG. 3 shows in detail a partial section of the lateral sealing device 48 and cutting device 32. In the embodiment, while conveyed downward by the distance corresponding to the length of one packaging material, the tubular packaging material 41 filled with the foodstuff is grasped by two pairs of forming flaps 31 so as to be formed into the approximate shape of the container. The tubular packaging material 41 is also grasped by the two pairs of sealing jaws 48 and opposite jaws 48. The two pairs form the lateral seal bands by sealing the tube in the direction in which the bands intersect the tube. Next, each seal band connecting the pillow-like preformed bodies is cut through the middle with the knife 33 of the cutting device 32, thereby severing the pillow-like preformed bodies 49 from each other. The knife 33 of the cutting device 32 has a cutting mechanism driven by a pressure medium (e.g., oil pressure, air pressure).

Patent Document 1: Japanese Patent Application Laid-Open No. 07-24938

DISCLOSURE OF THE INVENTION

Problem to be Solved by the Invention

The moisture content of a packaging material, the thickness of a laminated aluminum foil, the output of a lateral sealing device, and so on affect the quality of a lateral seal formed by the lateral sealing device. A cutting process may also be a factor in determining the quality of a lateral seal. The lateral sealing process includes melting plastic, cooling the seal, and, simultaneously, cutting the packaging material with a cutting knife. If the cutting quality of the knife is poor, the seal being cooled is pulled by the shear of the knife, with the result that the seal may be displaced from the predetermined area of the lateral seal band.

Such problems can be avoided by regularly replacing the knife of the cutting device. Quantitative measurement of the cutting quality of the knife enables the knife to be effectively used until imminent failure is indicated.

The function of the knife of the cutting device is to cut the packaging material of the container. However, as the cutting quality of the knife degrades, its cutting resistance may tend to pull the lateral seal of the packaging material formed by the lateral sealing device, leading to sealing failure in the course of cooling the seal. To counteract this, the external condition of the newly cut face of the material should be inspected or the knife should be replaced at fixed intervals. The service life of a knife depends on the packaging material to be cut with the knife. For instance, the stiffer the packaging material is, the shorter the service life of the knife becomes. To allow for a safe degree of wear and tear, the knife needs to be replaced earlier than the expected replacement time. This is laborious and increases component costs.

Accordingly, it is an object of the present invention to provide a packaging and filling apparatus and a packaging material cutting device, designed such that the service life of the knife of the cutting device is quantitatively grasped and the knife can be replaced at the appropriate time.

Means for Solving the Problem

The packaging and filling apparatus of the present invention is a packaging and filling apparatus for vertically sealing a web of packaging material in the form of a tube, filling the tube with a fluid product, forming lateral seal bands by sealing the tube in the direction in which the bands intersect the tube, cutting the middle of each lateral seal band of a series of pillow-like preformed bodies with a cutting device such that the pillow-like preformed bodies are severed from each other, thus forming a packaging and filling container of the final form, the packaging and filling apparatus characterized in that the cutting device comprises: a resistance measuring means for measuring the cutting resistance that a packaging material cutting blade in the cutting device receives from the packaging material, and then outputting a measurement value obtained: and a blade monitoring means for monitoring the condition of the packaging material cutting blade based upon the measurement value.

According to a preferred embodiment of the packaging and filling apparatus of present invention, the blade monitoring means monitors the condition of the packaging material cutting blade based upon a profile of the measurement value.

According to another preferred embodiment of the packaging and filling apparatus of the present invention, the blade monitoring means monitors the condition of the packaging material cutting blade based upon a comparison between the profile of the measurement value and a profile of a predetermined reference value.

According to another preferred embodiment of the packaging and filling apparatus of the present invention, the blade monitoring means monitors the condition of the packaging material cutting blade based upon a comparison, of a pressure difference between the maximum resistance pressure obtained from the profile of the measurement value and a constant resistance pressure following the maximum resistance pressure, with a reference value of a predetermined pressure difference.

In the above-mentioned embodiment, the packaging material cutting blade, namely a knife, is driven by a pressure medium. The knife moves to a material to be cut, and then starts cutting it. In the course of cutting, the speed at which the knife moves drops due to the cutting resistance to the knife. The speed change increases with the cutting resistance to the knife. When cutting is completed, the knife moves to the end stroke.

The cutting resistance that the packaging material cutting blade receives from the packaging material during the series of moving actions is measured in order to monitor the peak of the resistance pressure, namely the maximum resistance pressure, from the measurement value obtained. The peak pressure changes with the cutting resistance, which makes it possible to monitor a change in the cutting quality of the knife. However, a change in the original pressure of the pressure medium supplied, specifically a change in the constant resistance pressure following the maximum resistance pressure, may affect the peak pressure. Accordingly, in order to take account of this, a pressure difference found by subtracting the original pressure from the peak pressure is monitored. This makes it possible to accurately monitor the condition of the packaging material cutting blade based upon the comparison between the actual pressure difference and the reference value of the predetermined pressure difference.

The packaging material cutting device of the present invention is a packaging material cutting device for use in a packaging and filling apparatus for vertically sealing a web of packaging material in the form of a tube, filling the tube with a fluid product, forming lateral seal bands by sealing the tube in the direction in which the bands intersect the tube, cutting the middle of each lateral seal band of a series of pillow-like preformed bodies with a cutting device such that the pillow-like preformed bodies are severed from each other, thus forming a packaging and filling container of the final form, the cutting device characterized by comprising: a resistance measuring means for measuring the cutting resistance that a packaging material cutting blade in the cutting device receives from the packaging material, and then outputting a measurement value obtained; and a blade monitoring means for monitoring the condition of the packaging material cutting blade based upon the measurement value.

According to a preferred embodiment of the present invention, the blade monitoring means monitors the condition of the packaging material cutting blade based upon a comparison, of a pressure difference between the maximum resistance pressure obtained from a profile of the measurement value and a constant resistance pressure following the maximum resistance pressure, with a reference value of a predetermined pressure difference.

EFFECTS OF THE INVENTION

The present invention makes it possible to determine the cutting quality of the knife quantitatively, and hence time replacement before cutting failure occurs. This realizes a packaging and filling apparatus and packaging material cutting device, in which the knife of the cutting device can be replaced with appropriate timing by quantitatively determining the service life of the knife of the cutting device.

BEST MODES FOR PRACTICING THE INVENTION

Referring to the accompanying drawings, there will be described in detail a preferred embodiment of a packaging and filling apparatus and packaging material cutting device:

FIG. 1 is a diagram illustrating an example of a profile of measurement values obtained from a resistance measuring means of a packaging material cutting device according to the embodiment of the present invention;

FIG. 2 is a schematic perspective view of a packaging and filling apparatus that can be applied in the present invention; and FIG. 3 is a partially sectional view of a lateral sealing device and cutting device of the packaging and filling apparatus according to the embodiment of the present invention.

The cutting device according to the present invention is disposed downstream of the packaging and filling apparatus as shown in FIG. 2.

The web 41 of laminated packaging material wound in a roll is drawn out by the exemplified packaging and filling apparatus, and is conveyed within the packaging and filling apparatus by rollers. A strip of tape is joined to one edge of the web of the packaging material by a strip applicator 43. Subsequently, the web of packaging material is passed through a sterilizing liquid tank 44 to undergo sterilization. The squeeze roller and air knife 45 remove any sterilizing liquid remaining on the surface of the packaging material.

Then, forming rollers 46 form the web of packaging material into a tube. Specifically, one edge of the web of packaging material is covered with the other to form an overlap. The vertical seal element 42 vertically seals the overlap of the tube in the direction of the length of the tube. The filling pipe 47 fills the tube with a liquid foodstuff. While conveyed downward by a distance corresponding to the length of one packaging container, the tube is grasped by the sealing jaw and opposite jaw 48 of each lateral sealing device. Lateral seal bands are formed by sealing the tube in the direction in which the bands intersects the tube, and thus a series of pillow-like preformed bodies 49 are formed at the same time. A packaging material cutting blade (not shown) of a cutting device (not shown) cuts the middle of each lateral seal band between the pillow-like preformed bodies, thereby severing the pillow-like preformed bodies 49 from each other. Thus, packaging containers filled with the liquid foodstuff, which have the final form, are made.

With reference to FIG. 3 showing in detail a partial section of the lateral sealing device 48 and the cutting device 32, while conveyed downward by the distance corresponding to the length of the one packaging material, the tubular packaging material 41 filled with the fluid product is grasped by the two pairs of forming flaps 31 so as to be formed into the approximate shape of the container. The tubular packaging material 41 is also grasped by the two pairs of seal jaws 48 and opposite jaws 48. The two pairs form the lateral seal bands by sealing the tube in the direction in which the bands intersect the tube. Next, the middle of each seal band of the series of the pillow-like preformed bodies is cut with the knife 33 of the cutting device 32 that has a cutting mechanism driven by a pressure medium (e.g., oil pressure, air pressure). Thus, the pillow-like preformed bodies 49 are severed from each other.

According to the present invention, the cutting device comprises a blade monitoring means. The blade monitoring means is furnished with a resistance measuring means, such as a pressure sensor, for measuring the cutting resistance that the packaging material cutting blade receives from the packaging material and then outputting the measurement value obtained. The blade monitoring means monitors the condition of the packaging material cutting blade based upon the measurement value output.

In the present embodiment, the blade monitoring means monitors the condition of the packaging material cutting blade based upon a comparison, of a pressure difference between the maximum resistance pressure obtained from a profile of the measurement value and a constant resistance pressure following the maximum resistance pressure, with a reference value of a predetermined pressure difference.

FIG. 1 shows an example of the profile of the measurement value obtained by the resistance measuring means of the packaging material cutting device according to the embodiment of the present invention.

In the profile of the exemplified measurement, the axis of abscissa represents time (Time) whereas the axis of ordinate represents pressure (P). The packaging material cutting blade, driven by a pressure medium, is moved to a packaging material to be cut, and starts cutting it. As cutting proceeds, pressure increases suddenly. At the same time, the speed at which the knife is moved decreases due to cutting resistance. At this moment, the resistance pressure reaches its peak (peak pressure Pmax). The pressure subsequently starts to decrease but then maintains a constant value (constant resistance value Ps). Upon the completion of cutting, the measurement value suddenly drops and the knife moves to the end stroke.

According to the present embodiment, the cutting resistance that the packaging material cutting blade receives from the packaging material is measured, the peak pressure (Pmax) of the resistance pressure, namely the maximum resistance pressure, is monitored. A change in the constant resistance value (Ps) following the maximum resistance value affects the peak pressure. Accordingly, a pressure difference (dP) is measured by subtracting the original pressure (constant resistance pressure Ps) from the peak pressure (peak pressure Pmax). Based upon a comparison between the pressure difference thus obtained and the reference value of the predetermined pressure difference, the condition of the packaging material cutting blade can be accurately determined.

The reference value of the predetermined pressure difference is a pressure difference that indicates the need for the replacement of the packaging material cutting blade, which is determined theoretically or experimentally.

If the original pressure of the pressure medium supplied, namely the constant resistance pressure following the maximum resistance pressure, changes from P1 to P2, as shown in FIG. 1, the peak pressure may be affected. However, the present embodiment assures comparatively accurate monitoring regardless of the change of the peak pressure.

The present invention has been illustrated and described in a preferred practical embodiment, but it is understood that the invention is not limited to the preferred embodiment and other constructive variations may be applied in practice to it without thereby abandoning the scope of the protection of the present invention.

INDUSTRIAL AVAILABILITY

The packaging and filling apparatus and the cutting device according to the present invention produce a packaging container filled with a liquid foodstuff such as milk, juice, etc.

EXPLANATION OF REFERENCE NUMERALS

Figure 1:
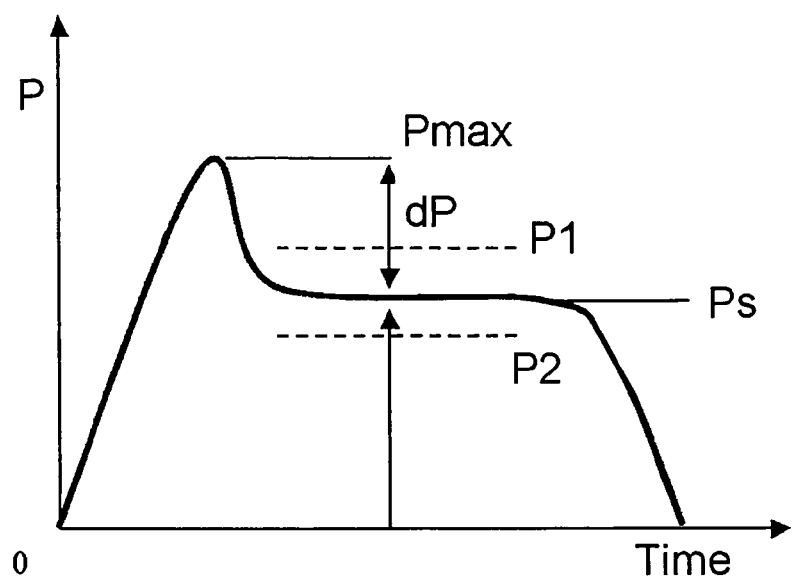
FIG. 1 is a diagram illustrating an example of a profile of measurement values obtained from a resistance measuring means of a packaging material cutting device according to the embodiment of the present invention.
Figure 2:
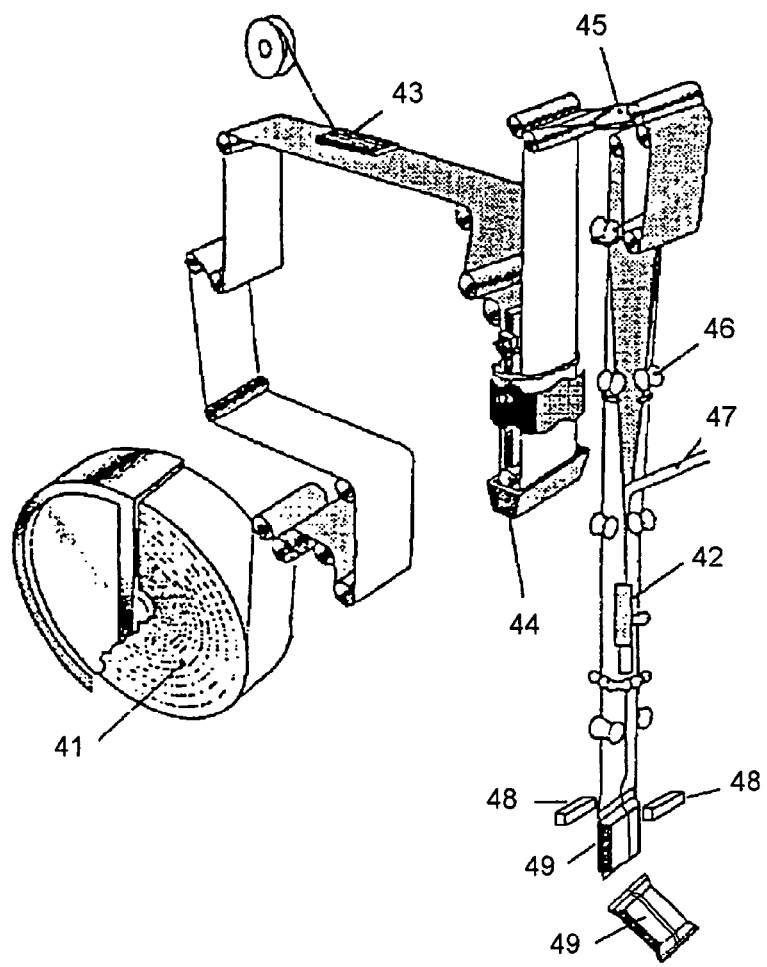
FIG. 2 is a schematic perspective view of a packaging and filling apparatus that can be applied in the present invention.
Figure 3:
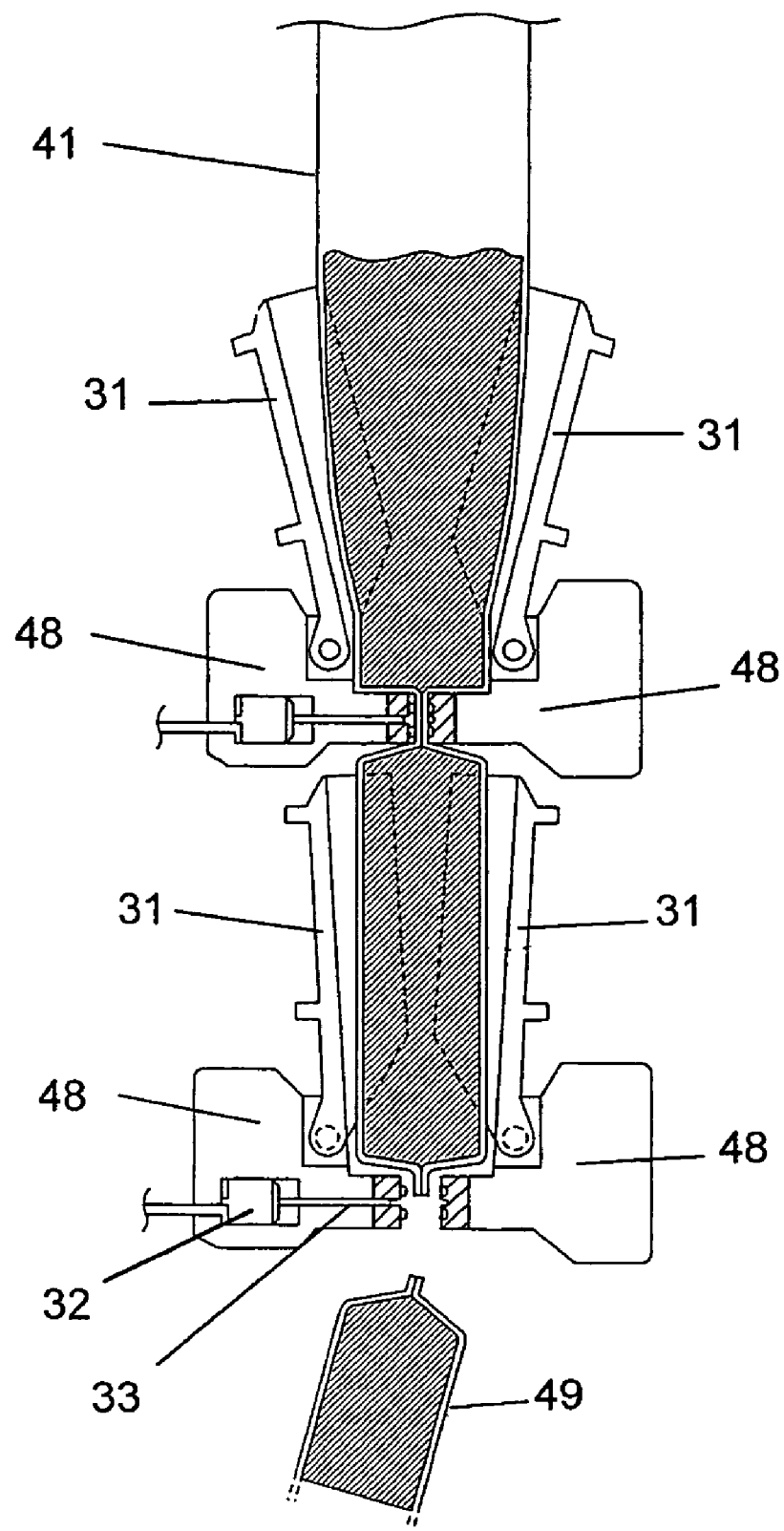
FIG. 3 is a partially sectional view of a lateral sealing device and cutting device of the packaging and filling apparatus according to the embodiment of the present invention.

31 FORMING FLAP
32 CUTTING DEVICE
33 KNIFE
41 TUBULAR PACKAGING MATERIAL
49 PILLOW-LIKE PREFORMED BODY

The invention claimed is:

1. A method of operating a packaging and filling apparatus comprising:
   longitudinally sealing a web of packaging material to form a tube of packaging material;
   filling the tube of packaging material with a fluid product;
   forming spaced apart lateral seals in the tube of packaging material to produce a plurality of interconnected fluid-containing preformed bodies;
   cutting the tube of packaging material at an intermediate region of the lateral seals with a cutting blade to separate the preformed bodies from each other and form individual fluid-containing containers;
   measuring a cutting resistance pressure that the cutting blade receives from the packaging material; and
   determining the condition of the cutting blade based upon a comparison of a difference between a maximum measured cutting resistance pressure and a constant measured cutting resistance pressure following the maximum measured cutting resistance pressure with a predetermined pressure difference reference value.

2. A packaging and filling apparatus for vertically sealing a web of packaging material in the form of a tube, filling the tube with a fluid product, forming lateral seal bands by sealing the tube in the direction in which the bands intersect the tube, cutting the middle of each lateral seal band of a series of pillow-like preformed bodies with a cutting device such that the pillow-like preformed bodies are severed from each other, thus forming a packaging and filling container of the final form, the packaging and filling apparatus characterized in that:
   the cutting device comprises:
   a resistance measuring means for measuring a cutting resistance pressure that a packaging material cutting blade in the cutting device receives from the packaging material, and then outputting a measurement value obtained; and a blade monitoring means for monitoring the condition of the packaging material cutting blade based upon the measurement value, wherein the blade monitoring means monitors the condition of the packaging material cutting blade based upon a comparison of a pressure difference between a maximum resistance pressure obtained from a profile of the measurement value and a constant resistance pressure following the maximum resistance pressure with a predetermined pressure difference reference value.

3. A packaging material cutting device for use in a packaging and filling apparatus for vertically sealing a web of packaging material in the form of a tube, filling the tube with a fluid product, forming lateral seal bands by sealing the tube in the direction in which the bands intersect the tube, cutting the middle of each lateral seal band of a series of pillow-like preformed bodies with a cutting device such that the pillow-like preformed bodies are severed from each other, thus forming a packaging and filling container of the final form, the cutting device characterized by comprising: a resistance measuring means for measuring a cutting resistance pressure that a packaging material cutting blade in the cutting device receives from the packaging material, and then outputting a measurement value obtained; and a blade monitoring means for monitoring the condition of packaging material cutting blade based upon the measurement value, wherein the blade monitoring means monitors the condition of the packaging material cutting blade based upon a comparison of a pressure difference between a maximum resistance pressure obtained from a profile of the measurement value and a constant resistance pressure following the maximum resistance pressure with a predetermined pressure difference reference value.

* * * * *